Jan. 7, 1958     R. T. BREYMEIER     2,819,059
APPARATUS FOR TRANSFERRING HIGHLY
REACTIVE MOLTEN METALS

Filed June 25, 1954     2 Sheets-Sheet 1

INVENTOR
RUDOLPH T. BREYMEIER
BY
Jackson B. Browning
ATTORNEY

INVENTOR
RUDOLPH T. BREYMEIER

United States Patent Office 2,819,059
Patented Jan. 7, 1958

2,819,059

APPARATUS FOR TRANSFERRING HIGHLY REACTIVE MOLTEN METALS

Rudolph T. Breymeier, Niagara Falls, N. Y., assignor to Union Carbide Corporation, a corporation of New York Application June 25, 1954, Serial No. 439,296

3 Claims. (Cl. 266—38)

The present invention relates to a metal handling system and, more particularly, to such a system for transferring metals such as sodium, potassium, and the like from a transporting vessel and supplying it at a desired rate to a chemical reaction vessel.

Metals such as sodium, potassium, and the like, are extremely reactive metals which are difficult to maintain in a pure state because they react readily with the moisture and oxygen of the air. In applications where the purity of the metal is of great importance, special precautions must, therefore, be taken to prevent contact of the metal with the surrounding atmosphere. This can be done by replacing the normal air atmosphere with a dried and purified inert gas with which the metal does not react. Any one of several inert gases, such as argon, helium, neon and the like, or mixtures thereof, is eminently suitable for such surrounding atmosphere.

Metals of this type are ordinarily transported in steel containers or tank cars, into which they are pumped in a liquid condition, being heated above their melting point. The metal solidifies in the shipping container upon cooling and, in order to remove the metal from the shipping container, it is necessary to reheat the container until the metal becomes molten, in which state it may be passed through appropriate piping means.

Since the interior of such piping means, and the molten metal passed therethrough, must be protected from the atmosphere, it is necessary to provide simple means by which connections may be made to the shipping containers without the introduction of air or moisture. Provision must be made for flushing air out of intermediate connecting piping and for preventing access of air to the shipping container during the emptying cycle.

It is, therefore, the main object of the present invention to provide a simple system for rapidly and efficiently transferring metals, which in the molten state are highly reactive with the atmosphere, from a transporting container and supplying it, out of contact with atmospheric air, at a desired rate to a chemical reaction vessel.

Other aims and advantages will be apparent from the following description and appended claims.

In accordance with the present invention, a handling system is provided for transferring metal which, in the molten form, is highly reactive with the atmosphere. Sodium, potassium, calcium, magnesium, and the like, are examples of such metals.

Figure 2:
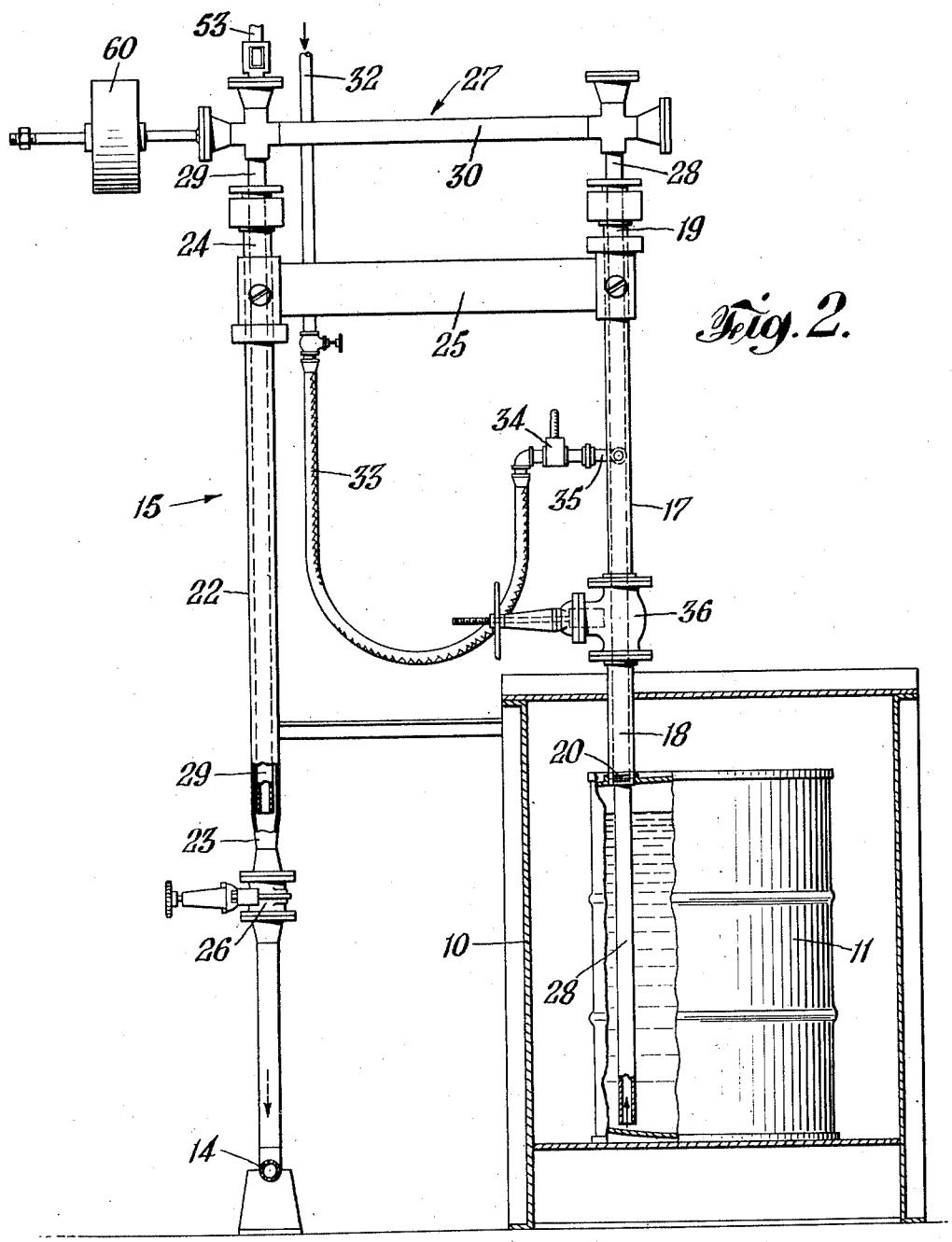
Fig. 2 is a vertical elevational view of that portion of the handling system of Fig. 1 in which removal of the reactive metal from the transporting vessel is accomplished.

Referring more specifically to the drawings, the piping system comprises a single central conduit 14 communicating between two end assemblies 15 and 16 for extracting molten metal from a shipping container and introducing it into a chemical reaction vessel, respectively. In the region of melting furnace 10, a first conduit 17 is provided, having first and second ends 18 and 19, which passes into furnace 10 and communicates with the interior of container 11. End 18 engages container 11, as by thread means 20 shown in Fig. 2 of the drawings, thereby forming a gas-tight connection. A second conduit 22, having ends 23 and 24, is provided in proximity with and substantially parallel to first conduit 17, and bracing means 25 may be employed to aid in maintaining the parallel alignment of conduits 17 and 22 (while allowing longitudinal movement of either with respect to the other). End 23 of conduit 22 is in communication with central conduit means 14, such as through valve means 26.

First generally U-shaped conduit means 27 is provided having leg members 28 and 29 connected through portion 30. Leg member 28 is slidably mounted internally in conduit 17 through end 19 thereof and is adapted to pass therethrough to the bottom of container 11. Leg member 29 is slidably mounted internally in conduit 22 through end 24 thereof. Packing means 31 are provided at end 19 of conduit 17 and end 24 of conduit 22 to form a gas-tight seal between the annular spaces between the interior of conduits 17 and 22 and the atmosphere.

Figures 1, 3:
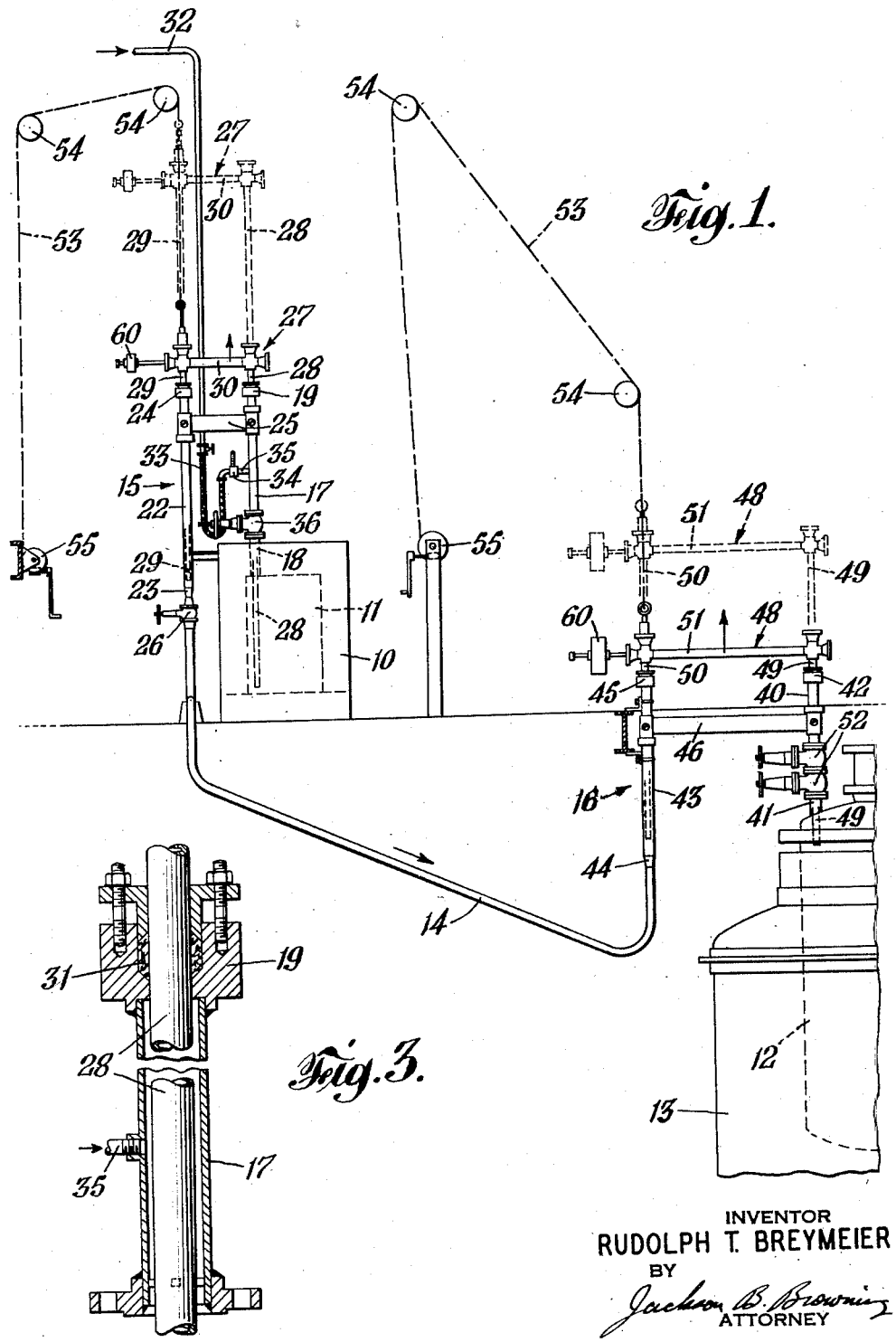
Fig. 1 is a vertical elevational view of a reactive metal handling system embodying the invention.
Fig. 3 is a vertical sectional view of the telescoping piping arrangement of that portion of the handling system of Fig. 2 which serves to remove the molten reactive metal from the transporting vessel.

The arrangement of U-shaped conduit means 27 in conduits 17 and 22 permits the telescoping movement of conduit means 27 in and out of these conduits between the positions shown in Fig. 1 of the drawings.

A gas inlet means is associated with conduit 17 for passing an inert gas, such as argon, helium, or the like, through the annular space formed between conduits 17 and leg member 28 of conduit means 27. As shown in the drawing, such inlet means comprises a conduit 32, communicating flexible conduit 33, flowmeter 34 and inlet conduit 35. Shut-off valve 36 is provided in conduit 17 to prevent the flow of inert gas from the annular space, through the open end 18 of conduit 17, when desired.

End assembly 16, in the vicinity of said chemical reaction vessel, comprises conduit means 40 having ends 41 and 42, the former in communication with the interior of reaction vessel 12, and conduit means 43, substantially parallel thereto and having ends 44 and 45, which is a communicating extension of central conduit 14 at end 44. Bracing means 46 may be employed to aid in maintaining the parallel alignment of conduits 40 and 43 (while allowing longitudinal movement of either with respect to the other).

Second generally U-shaped conduit means 48 is provided having leg members 49 and 50 connected through portion 51. Leg member 49 is slidably mounted internally in conduit 40 through end 42 thereof and is adapted to pass therethrough into the interior of reaction vessel 12. Leg member 50 is slidably mounted in the interior of conduit means 43 through end 45 thereof. This arrangement permits a telescoping raising and lowering of conduit means 48 in and out of conduits 40 and 43 between the positions shown in Fig. 1 of the drawings in the same manner as conduit 27, in the vicinity of heating furnace 10. Packing means, such as elements 31 of Fig. 3, are provided to form gas-tight seals at ends 42 and 45 of conduits 40 and 43. Valve means 52 are provided in line 40 and may be employed for purging the system of air.

Elevating means, such as shown schematically in the drawings, may be provided to raise the generally U-shaped conduits in their sliding mounting. Such means comprise cables 53, rollers 54, and cranking means 55, which operate to elevate conduit means 27 and 48 in turn causing leg members to elevate in conduits 17—22, and 40—43, respectively. Weights 60 may be provided to balance U-shaped conduits 27 and 48 so that they may be raised by a non-axially aligned cable 53.

In operating the handling system of the invention, to transfer reactive metal from the solid state in container 11 to molten metal in reaction vessel 12, the following procedure is followed.

A container of metal is placed in furnace 10 and end 18 of conduit 17 is lowered into the furnace into engagement therewith, with conduit means 27 in the elevated position. Inert gas is then passed through the annular space between conduits 17 and 28 and into the upper end of container 11 and thereby allowing the inert gas to pass through and purge the system through leg member conduit 28, connecting conduit 30, leg member conduit 29, central conduit 14, conduits 50, 51 and 49 to an outlet vent (not shown) in reaction vessel 12. When the system is thus purged of contaminant gas, the furnace 10 is started and brought to a temperature greater than the melting point of the metal. At this point, U-shaped conduit member 27 is lowered, causing leg member 28 to pass to the bottom of the now molten metal in container 11. Molten metal is then passed through the system through connecting conduits 28, 30, 29, 14, 43, 50, 51 and 49, under the inert gas pressure which is developed on the surface of the molten metal in container 11.

The system of the present invention has been successfully employed to transfer sodium metal from containers to reaction vessels out of contact with air.

It is, of course, to be understood that other means, equivalent to those shown in the drawings and described in detail herein, may alternatively be employed without departing from the broader teachings of the present invention.

What is claimed is:

1. Apparatus for transferring metal which is highly reactive with atmospheric air in the molten state comprising, in combination, a furnace for heating a container of said metal to convert the solid metal therein to the molten state; first conduit means, having first and second ends, adapted at said first end for insertion into said heating furnace and communication with the interior of said container; second conduit means, having first and second ends, substantially parallel to said first conduit means in the region of said first end and adapted to receive molten metal for transferral to a reaction vessel at said second end; generally U-shaped conduit means having an external diameter smaller than the internal diameter of said first and second conduit means, one leg thereof slidably mounted in said first conduit means through said second end and adapted to pass therethrough to the bottom of said container, and the other leg thereof slidably mounted in said second conduit means through said first end thereof; packing means mounted at said second end of said first conduit means and said first end of said second conduit means for providing a gas-tight seal between the atmosphere and the annular spaces formed between the internal surfaces of said first and second conduit means and said legs of said generally U-shaped conduit means mounted therein; gas inlet means associated with said first conduit means for passing an inert gas through the annular space between the internal surface of said first conduit means and said leg of said generally U-shaped conduit means slidably mounted therein, and valve means associated with said first end of said first conduit means for closing off said conduit to the atmosphere.

2. A handling system for transferring metal which is highly reactive with atmospheric air in the molten state from a container to a reaction vessel out of contact with atmospheric air comprising, in combination, a furnace for heating said container of said metal to convert the metal from the solid to molten state; first conduit means, having first and second ends, adapted at said first end for insertion into said heating furnace and communication with the interior of said container; second conduit means, having first and second ends, substantially parallel to said first conduit means in the region of said first end and adapted to receive molten metal for transferral to a reaction vessel at said second end; generally U-shaped conduit means having an external diameter smaller than the internal diameter of said first and second conduit means, one leg thereof slidably mounted in said first conduit means through said second end and adapted to pass therethrough to the bottom of said container, and the other leg thereof slidably mounted in said second conduit means through said first end thereof; packing means mounted at said second end of said first conduit means and said first end of said second conduit means for providing a gas-tight seal between the atmosphere and the annular spaces formed between the internal surfaces of said first and second conduit means and said legs of said generally U-shaped conduit means mounted therein; gas inlet means associated with said first conduit means for passing an inert gas through the annular space between the internal surface of said first conduit means and said leg of said generally U-shaped conduit means slidably mounted therein; valve means associated with said first end of said first conduit means for closing off said conduit to the atmosphere; third conduit means having first and second ends, said first end communicating with said reaction vessel; said second conduit means being substantially parallel to said third conduit means in the region of said second end of said second conduit means; second generally U-shaped conduit means having an external diameter smaller than the internal diameter of said second and third conduit means, one leg thereof slidably mounted in said second conduit means through said second end and the other leg thereof slidably mounted in said third conduit means through said second end; and packing means mounted at said second ends of said second and third conduit means for providing gas-tight seals between the atmosphere and the annular space found between the internal surface of said second and third conduits and said legs of said second generally U-shaped conduit means mounted therein.

3. Apparatus for transferring metal which is highly reactive with atmospheric air in the molten state comprising, in combination, a furnace for heating a container of said metal to convert the solid metal therein to the molten state; first conduit means, having first and second ends, adapted at said first end for insertion into said heating furnace and communication with the interior of said container; second conduit means having an external diameter smaller than the internal diameter of said first conduit means, slidably mounted in said first conduit means and adapted to pass therethrough to the bottom of said container; packing means mounted at said second end of said first conduit means for providing a gas-tight seal between the atmosphere and the annular space formed between the internal surfaces of said first and second conduit means mounted therein; and gas inlet means associated with said first conduit means for passing an inert gas through the annular space between the internal surface of said first conduit means and said second conduit means slidably mounted therein.

References Cited in the file of this patent

UNITED STATES PATENTS

| 1,715,678 | Schneider | June 4, 1929 |
| 2,020,628 | Woodruff | Nov. 12, 1935 |
| 2,448,903 | Miller | Sept. 7, 1948 |
| 2,678,240 | Snow | May 11, 1954 |

OTHER REFERENCES

Pages 214-219 incl., Liquid-Metals Handbook (2nd ed.), June 1952.